(No Model.)  6 Sheets—Sheet 1.
P. D. CABLE.
RAILWAY ELECTRIC SIGNAL.
No. 421,239. Patented Feb. 11, 1890.
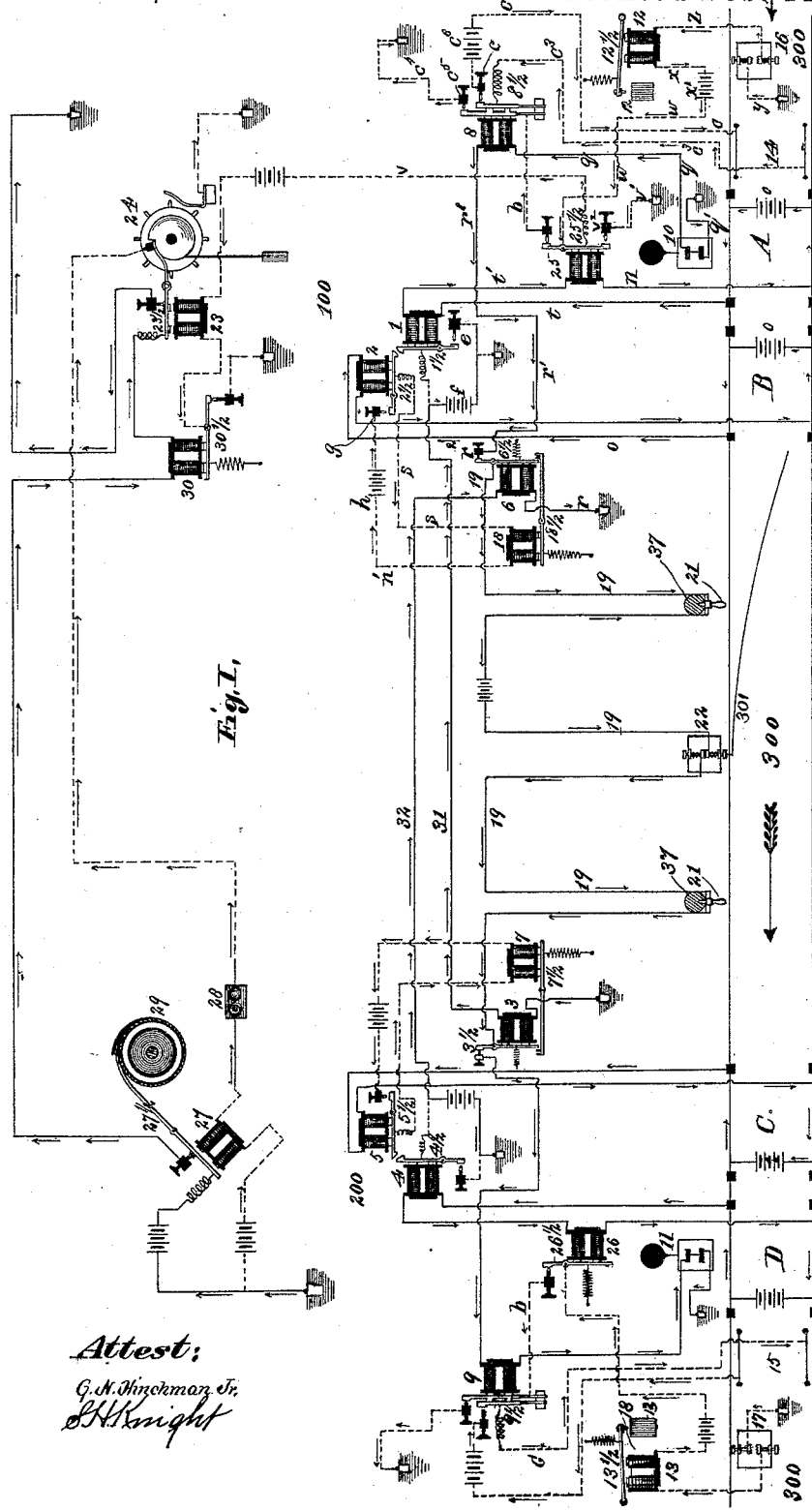
Fig. I.
Attest:
G. N. Hinchman Jr.
J. H. Knight
Inventor:
Paul D. Cable
By Knight Bro (No Model.)   6 Sheets—Sheet 2.
P. D. CABLE.
RAILWAY ELECTRIC SIGNAL.
No. 421,239. Patented Feb. 11, 1890.
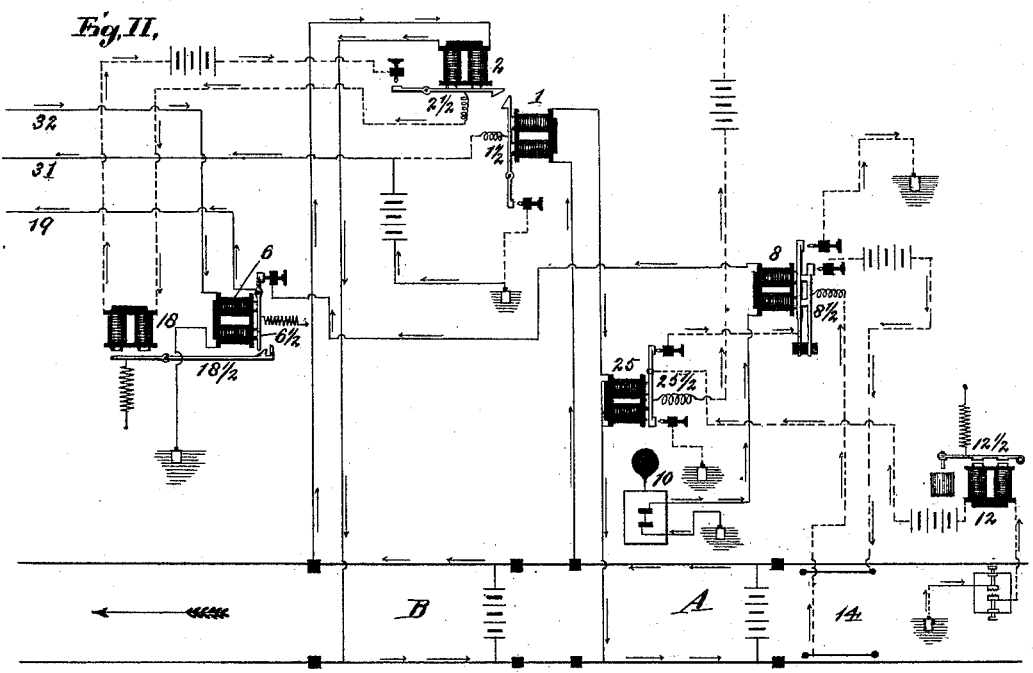
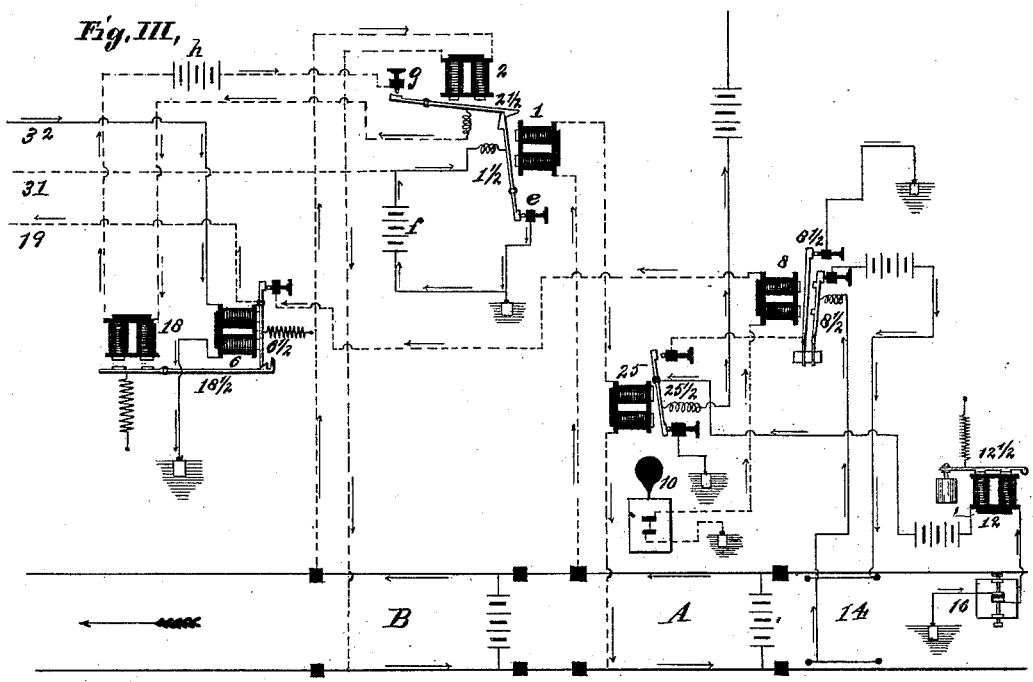
Attest:
G. W. Hinchman Jr.
S. H. Knight.
Inventor:
Paul D. Cable
By Knight Bro
Att'ys.

(No Model.)  6 Sheets—Sheet 3.
P. D. CABLE.
RAILWAY ELECTRIC SIGNAL.
No. 421,239.  Patented Feb. 11, 1890.
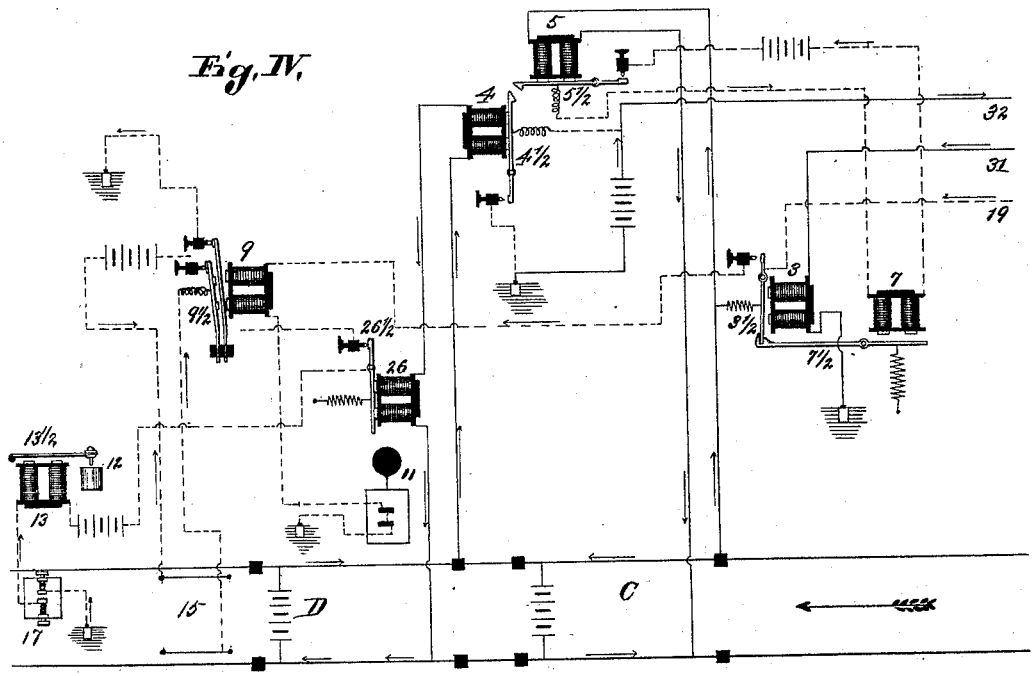
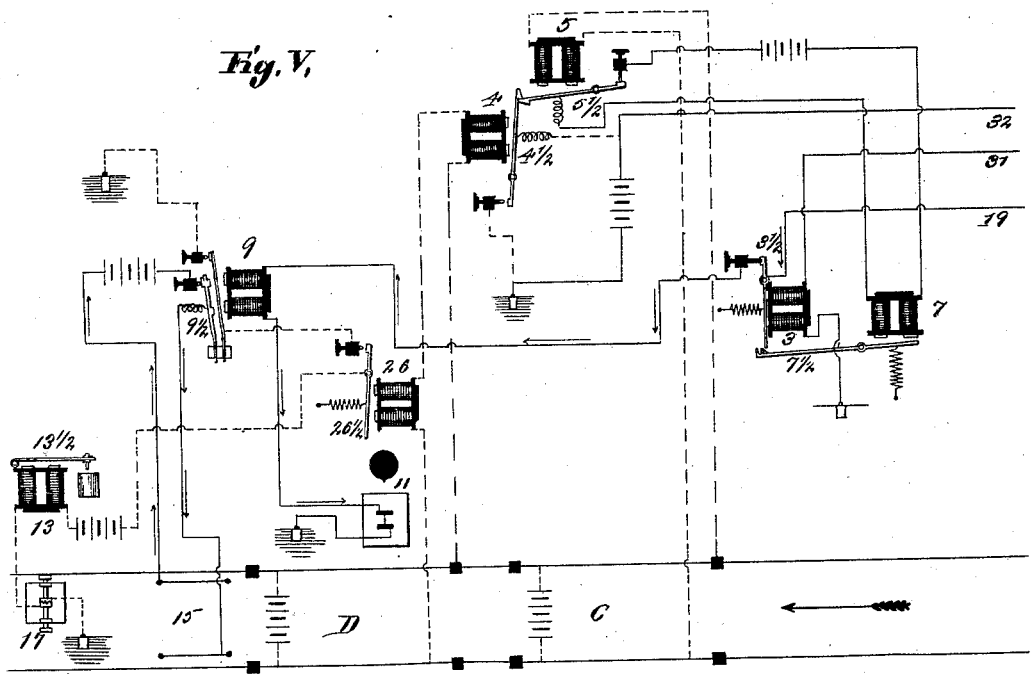
Attest:
G. W. Hinchman Jr.
S. H. Knight.
Inventor:
Paul D. Cable
By Knight Bro
att'ys (No Model.) 6 Sheets—Sheet 4.
P. D. CABLE.
RAILWAY ELECTRIC SIGNAL.
No. 421,239. Patented Feb. 11, 1890.
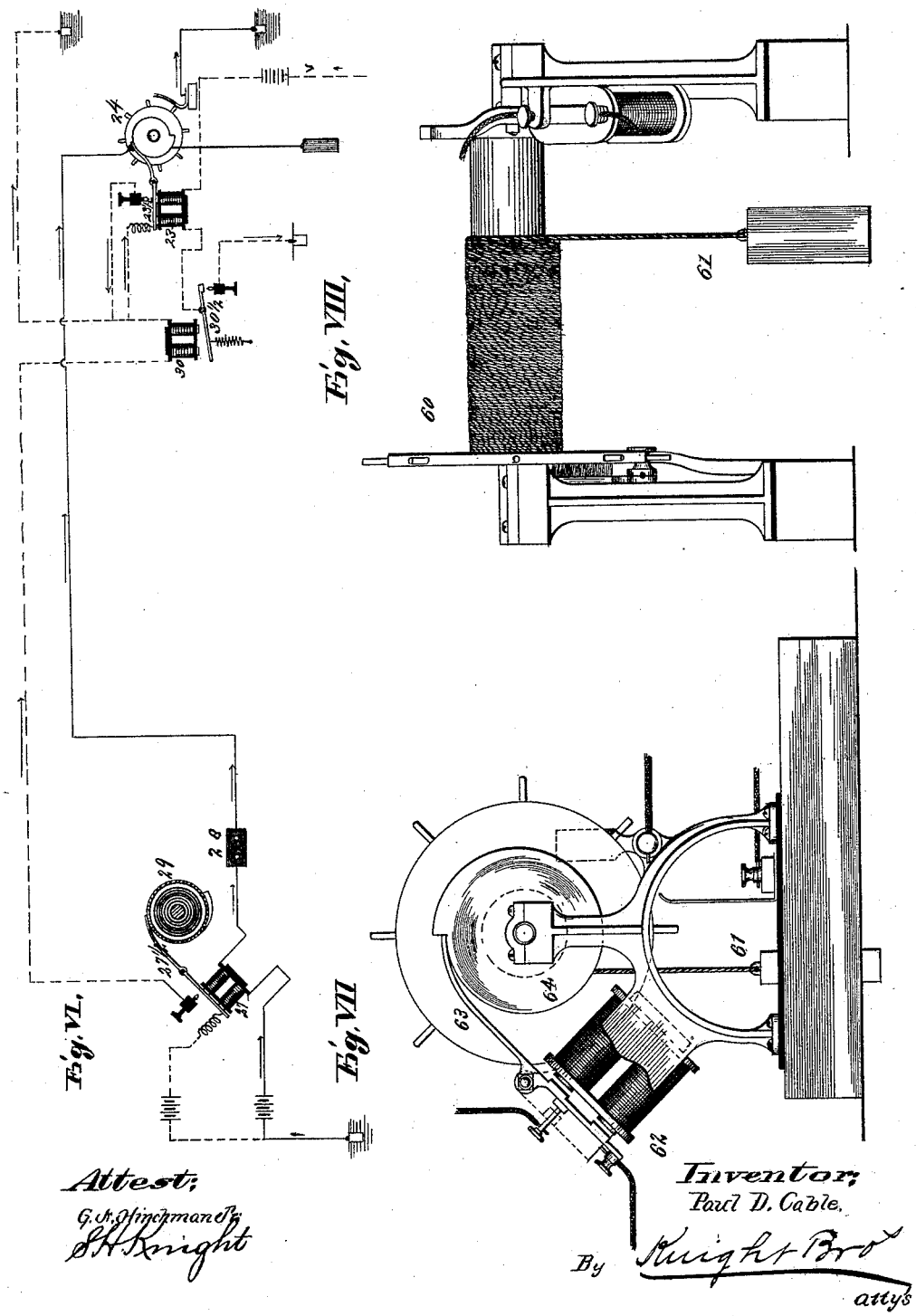
Attest:
G. J. Hinckman Jr.
S. H. Knight
Inventor:
Paul D. Cable.
By Knight Bro
attys (No Model.) 6 Sheets—Sheet 5.
P. D. CABLE.
RAILWAY ELECTRIC SIGNAL.
No. 421,239. Patented Feb. 11, 1890.
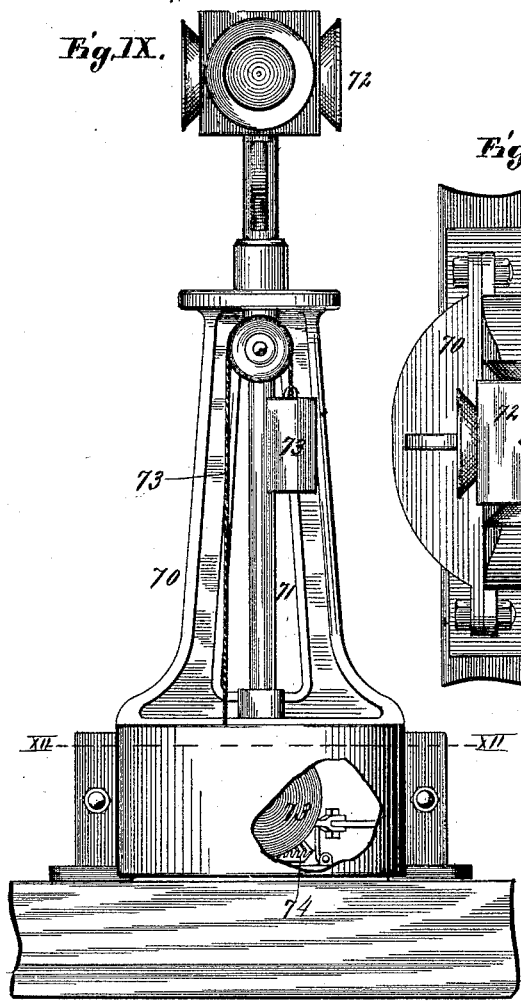
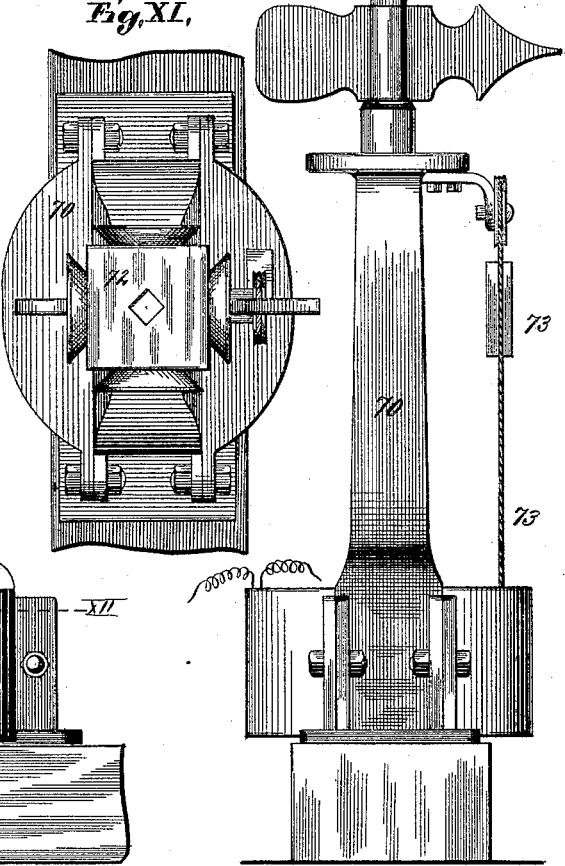
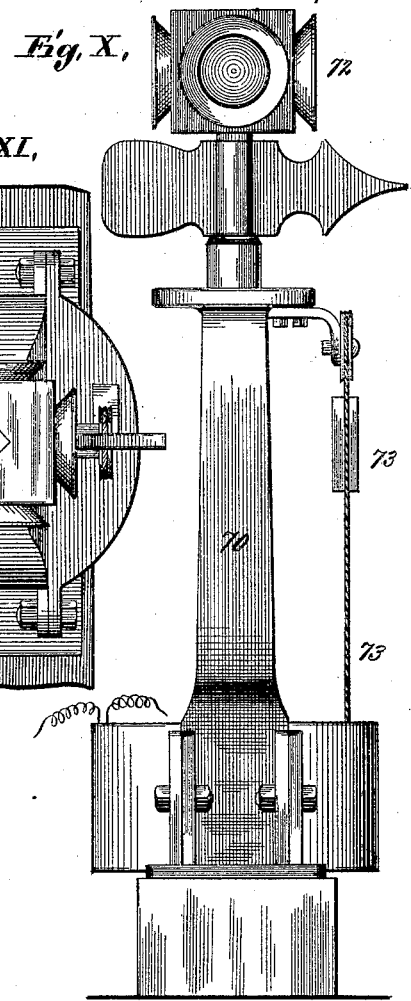
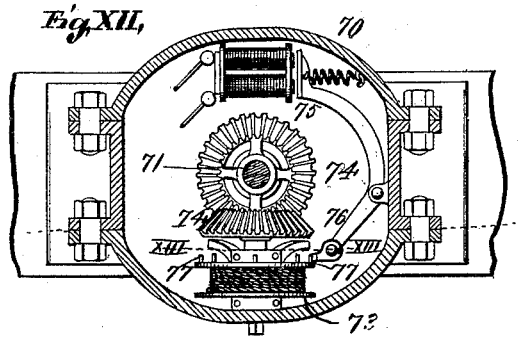
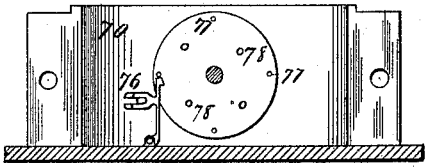
Attest:
G. N. Hinchman Jr.
S. H. Knight.
Inventor:
Paul D. Cable.
By Knight Bro
attys.

(No Model.)  6 Sheets—Sheet 6.
P. D. CABLE.
RAILWAY ELECTRIC SIGNAL.
No. 421,239.  Patented Feb. 11, 1890.
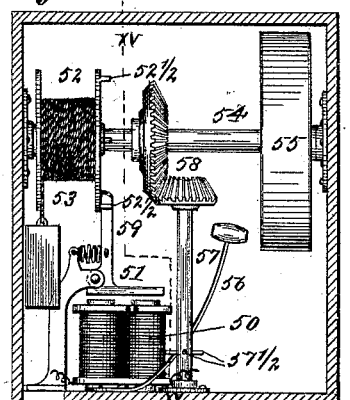
Fig. XIV.
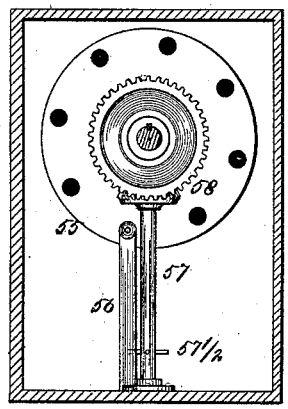
Fig. XV.
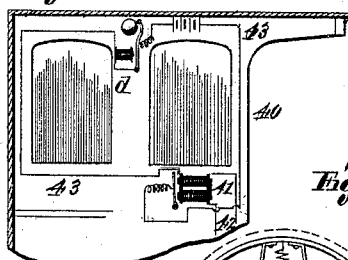
Fig. XVIII.
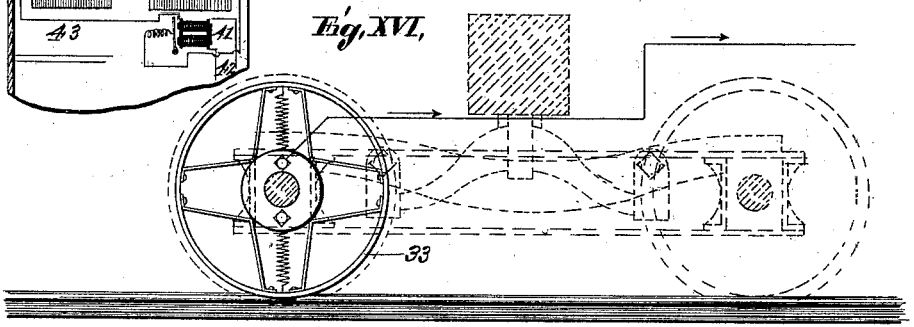
Fig. XVI.
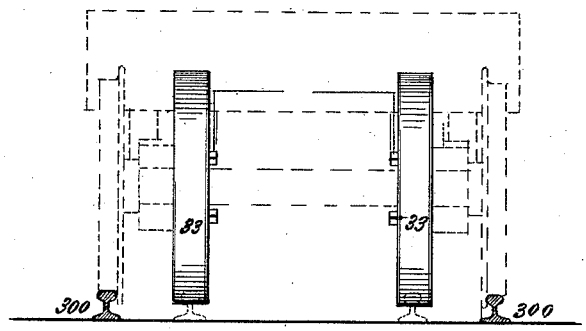
Fig. XVII.
Attest:
G. N. Hinchman Jr.
S. H. Knight.
Inventor:
Paul D. Cable
By Knight Bro
Att'ys.

UNITED STATES PATENT OFFICE.

PAUL DOZIER CABLE, OF ST. LOUIS, MISSOURI.

RAILWAY ELECTRIC SIGNAL.

SPECIFICATION forming part of Letters Patent No. 421,239, dated February 11, 1890.

Application filed August 31, 1888. Serial No. 284,245. (No model.)

*To all whom it may concern:*

Be it known that I, PAUL DOZIER CABLE, of the city of St. Louis, in the State of Missouri, have invented a certain new and useful Improvement in Railway Electric Signals, of which the following is a full, clear, and exact description, reference being had to the accompanying drawings, forming a part of this specification, and in which—

Figure I is a diagram illustrating my improved system, showing both ends of the block. Fig. II shows one end of the block with the relays and signals in their normal position. Fig. III is a like view, but showing the parts in the position they occupy when the train has passed over the first section of this end of the block. Fig. IV shows the other end of the block from that shown in Figs. II and III, with the parts in the position they occupy when they have been acted upon by the train passing over the end of the block shown in Figs. II and III. Fig. V shows the end of the block shown in Fig. IV, with the parts in the position they occupy when the train is on the outer section of the track at this end of the block, and before it has left the inner section of the track at this end of the block. Fig. VI represents the recorder and the train-dispatcher's signal. Fig. VII is an enlarged end view of the drum and its accompanying parts of the circuit-breaker located in the train-dispatcher's office. Fig. VIII is an elevation of same. Fig. IX is a side view of one of the signals. Fig. X is an edge view of same. Fig. XI is a top view of same. Fig. XII is a horizontal section taken on line XII XII, Fig. XI. Fig. XIII is a section taken on line XIII XIII, Fig. XII. Fig. XIV is a section through the housing of one of the torpedo-signals showing the parts within in elevation. Fig. XV is a section taken on line XV XV, Fig. XIV. Fig. XVI is a section through one of the trucks of a car, showing one of the contact-wheels. Fig. XVII is an end view of same, showing the main wheels and frame of the truck in dotted lines and the contact-wheels in full lines. Fig. XVIII represents a locomotive-cab having arranged therein a local circuit with its relay and connections with the line-circuit.

My invention relates to that class of electric signals known as "block-signals;" and my invention consists in features of novelty hereinafter fully described, and pointed out in the claims.

Referring to the drawings, 100 represents one end of the block or system, and 200 the other end. These ends are in practice placed a considerable distance apart and are connected by line-wires 19, 31, and 32.

300 represents a railway-track, having insulated sections A B at the end 100 and insulated sections C D at the end 200. These sections A B C D form parts of the electric circuit.

The end 100 of the block has relays 1 and 2 and the end 200 corresponding relays 4 and 5.

The system will be best understood by a description of its operation.

We will suppose an engine to be coming toward section A, as indicated by arrow $a$. As the front wheels of the engine strike section A, the iron axles and wheels cut off the battery-supply of relay 1, which releases armature $1\frac{1}{2}$, which in turn cuts off the battery-supply of a relay 3 at the other end of the block, which releases armature $3\frac{1}{2}$, which falls back into a slot of an armature $7\frac{1}{2}$ of a relay 7, where it is held fast, thereby opening the electric circuit and cutting off the battery-supply of relay 8 and 9, and also from signals 10 and 11, the relay 8 and signal 10 being at the end 100 of the block and the relay 9 and signal 11 being at the end 200 of the block. This action causes the armatures $8\frac{1}{2}$ and $9\frac{1}{2}$ to be released and signals 10 and 11 to turn to "danger." Now, when armatures $8\frac{1}{2}$ and $9\frac{1}{2}$ are released, they make the electrical contact of the wires $b$, which lead to torpedo-signals 12 and 13 and the wires $c$ leading to cab signal-rails 14 and 15. When armatures $8\frac{1}{2}$ and $9\frac{1}{2}$ are released, they complete the battery-supply as far as it is possible for them to do of signals 12 and 13 and 14 and 15. When they are in this position, if a train were to pass over contact-box 16 or 17 it would make the electric circuit fully complete, operating the torpedo-signal whose box it had passed over—as, for example, No. 16 contact-box would work 12 torpedo-signal. Then the engine, passing over the two pieces of rail 14 or 15, brings the two contact-wheels 33 on the engine (see Fig. XVII) to bear on the rails and completes the electric circuit in the cab of the engine, and either rings the signal-bell $d$ (see Fig. XVIII) or puts on the air-brakes or whatever the signal may be. We left the engine on section A. We will now suppose it to have advanced until it is standing on sections A and B. We now have the battery cut off from relays 1 and 2; but relay 1, dropping its armature before relay 2, keeps armature $2\frac{1}{2}$ from making its electric contact, as fully explained hereinafter, but does not hinder armature $1\frac{1}{2}$ from making its contact-point, and it, as before explained, cuts off the battery-supply of relay 3 and allows its armature $3\frac{1}{2}$ to be drawn into the slotted armature $7\frac{1}{2}$, there to be held until released by the train passing section C. The engine now moves off both sections A and B into the division between the ends 100 and 200. The armatures $1\frac{1}{2}$ and $2\frac{1}{2}$ then return to their normal position; but this does not release armature $3\frac{1}{2}$, it having been drawn back by its spring and caught in slotted armature $7\frac{1}{2}$, which holds it against the force of its own relay, which has been exerting its force since the engine left sections A and B, caused by armature 1 having been attracted to its normal position. We will next suppose the engine to have reached the end 200 of the block and it must set its signals normal before leaving. Then we will have engine on section C. Its wheels and axles will cut off the battery-supply from relay 5, which causes it to release its armature $5\frac{1}{2}$, which in turn completes the electric circuit and battery-supply of relay 7, which exerts its energy on its armature $7\frac{1}{2}$, and therefore releases armature $3\frac{1}{2}$ from where it has been held fast since the engine struck section A. Now, when the armature $3\frac{1}{2}$ is attracted to its normal position it closes the electric circuit and completes the battery-supply to relay 8 and 9, and also signals 10 and 11, and this action causes the armatures $8\frac{1}{2}$ and $9\frac{1}{2}$ to be attracted and signals 10 and 11 to show a clear track. When armatures $8\frac{1}{2}$ and $9\frac{1}{2}$ are attracted, they break the electrical contact of the wires which lead to the torpedo-signals 12 and 13 and the wires which lead to the cab signal-rails 14 and 15, which are then in a normal position. We will suppose the engine to have advanced until it is on sections C and D. We now have the battery-supply cut off from relay 5 and relay 4; but relay 5, dropping its armature before relay 4, keeps armature $4\frac{1}{2}$, as hereinafter explained, from making its electric contact, but does not hinder armature $5\frac{1}{2}$ from making its contact-point. There the engine, having unlocked the block it had just passed through, leaves it ready for the next train or in a normal position. Let us suppose, for a further illustration, that a long train is coming toward section A. When the engine strikes section A, it sets all the signals both in the front and rear of the block, among which is the torpedo-signals 12 and 13. Now, according to previous illustration, when the currents are all set for "danger," it will be seen that the passage of a pair of wheels over either contact-box 16 or 17 will fire off the torpedo. Now the engine has just struck section A, setting all the currents for "danger," and its train is still passing over contact-box 16; but the topedo-signal did not explode, because at the time the train passed over this contact-box 16 the currents were in the normal position of the circuits, and, although the contact in box 16 was made, the circuit was broken in relay 25. Now, the engine, having struck section A, sets the currents for "danger," and the rest of the train, passing over contact-box 16, as before stated, would start the torpedo-signal 12 to work; but at the same time that the engine cut off the battery from relay 1 it also cut it off from relay 25. Therefore its armature $25\frac{1}{2}$ broke the contact in the wires leading to torpedo-signal 12, so that it cannot work until after the train passes over section A; but the next train that comes along cannot reach section A and shut off the battery from torpedo-signals 12 and 13 until it has fired off a portion of the charge of the machine. Now the action, when all summed up, is that when a block is all right the train is allowed to reach section A and shut off its torpedo-signal; but when the circuits are set for "danger" the train operates the torpedo-machine before it can reach section A; but when it does reach section A it cuts off the battery the same as the first train did. We now come to the automatic register, which is supposed to indicate in the train-dispatcher's office the number of the blocks that the train strikes on its route. These signals are arranged so that two cannot be sent at once to interfere with each other, for while one is being sent in the other must wait for its turn. While a train is passing over section A it cuts off the battery from relay 25, which releases its armature $25\frac{1}{2}$, which in turn completes the electric circuit of relay 23, providing there is no other train being registered at the same time. The relay 23 attracts its armature $23\frac{1}{2}$, and it in turn releases the drum of the circuit-breaker 24, which revolves until it has completed and broken alternately the circuit of relay 27 and bell 28 the requisite number of times, each impulse being sounded on the bell 28, and the armature $27\frac{1}{2}$ of relay 27, being attracted by the first impulse, releases the "Morse" recorder 29 (which registers each impulse) and also breaks the circuit of relay 30, and its armature $30\frac{1}{2}$ will in turn cut off the battery of all such relays, as 23, and prevent them from sending in any more signals until the first is received.

With this system of electrical signals it is supposed to give three distinct signals as to the condition of a desired block or division. The block or division may be made to control any desired distance. Then, again, they can be made to lap each other. Thus, if the block was one mile long they would receive the signals one-half mile from the block, and if they were fifty miles long they would receive the signals of the block ahead while they were midway of the present block. In case of danger the signal on the side of the track is turned from a white light to a red light, and as the train passes the torpedo-signals there are as many torpedoes exploded as desired, still holding more in reserve. Then there are signals received in the cab of the engine—such as ringing a bell or putting on the air-brakes—as required. The train also registers the number of the block being received in the train-dispatcher's office. The signals are set to "danger" in case a switch is displaced, which is connected with the system, also of a fallen bridge carrying the wires 19, 31, and 32, and in case of a train breaking in two the signals can be set on both sides of the dead-section. If any of the wires running the full length of the block get broken, the signals for that block will be set for "danger."

As a further explanation, I would say that if we cut the battery off from relay 1 it will release its armature $1\frac{1}{2}$ and the spring attached to the armature will draw it back until the lower portion of the armature is brought into electrical contact with point $e$, thereby completing the electric circuit, which cuts off battery $f$. Suppose the battery of relay 1 to be still cut off and its armature resting against its contact-point $e$. Let us now cut off the battery from relay 2. Its armature is then drawn back by its spring; but armature 1, lying against its contact-point $e$, is right in the path of armature $2\frac{1}{2}$, so that instead of armature $2\frac{1}{2}$ being drawn back into contact with its contact-point $g$ it rests against armature $1\frac{1}{2}$, thereby just clearing its contact-point $g$. On the back of each armature there is a small hook, so that as long as armature $2\frac{1}{2}$ rests on armature $1\frac{1}{2}$ armature $1\frac{1}{2}$ cannot return to its normal position, although its battery be restored; but when the battery to relay 2 is restored the armature $2\frac{1}{2}$ returns to its normal position, thereby releasing armature $1\frac{1}{2}$. Now, if the battery from relay 2 were to be cut off the position of the armature would just be reversed—that is, armature $2\frac{1}{2}$ would complete the electric circuit of battery $h$ by coming into contact with its point $g$. Then if armature $1\frac{1}{2}$ is released it will rest against armature $2\frac{1}{2}$, just clearing its contact-point $e$, and also keeping armature $2\frac{1}{2}$ from returning to its normal position. So it will be seen that only one contact can be made while a train passes over their respective battery-sections.

The relays 4 and 5 have hooks on their armatures the same as the armatures of relays 1 and 2.

The notches on the ends of armatures $7\frac{1}{2}$ and $18\frac{1}{2}$ are so formed that they will receive the ends of the armatures $3\frac{1}{2}$ and $6\frac{1}{2}$ and hold the armatures $3\frac{1}{2}$ and $6\frac{1}{2}$ until they (the armatures $7\frac{1}{2}$ and $18\frac{1}{2}$) are operated by their magnets 7 and 18.

19 represents the wire connecting relays 3 and 6. 31 represents the wire connecting relays 1 and 3, and 32 represents the wire connecting relays 6 and 4, all of these wires 19, 31, and 32 extending from the end 100 to the end 200 of the block. The wires 19, I prefer to extend at suitable intervals to the telegraph-poles 37, situated along the track, (see Fig. I,) and to locate in the wires at the poles plugs 21. The removal of any one of the plugs 21 will break the circuit through wire 19, and the signals will be set to "danger," so that if a train should break in two all that would be necessary to be done would be remove one of the plugs 21 and the signal is given.

22 represents contact-blocks of any well-known construction and controlled by the position of the switch 301 in the track, the displacement of which switch breaks circuit 19, which also sets the signals to "danger." There may be any number of these placed between the two ends of the block.

Should the wire 19 become broken, the batteries of relays 8 and 9 will be cut off, which has the same effect as a train passing over sections A and B—that is, it sets the signals to "danger."

$z$ represents the wire from the relay 12 to the contact-box 16; $y$, the ground-wire of the box; $x$, the wire from the relay 12 to a battery $x'$; $w$, a wire from the battery $x'$ to the armature of the relay 25; $v$, a wire from the armature of relay 25 to the relay 23; $v'$, a wire from the contact-point $v^2$ of relay 25 to the ground; $u$, a wire from the magnet of relay 25 to the track 300; $t$, a wire from the track to the magnet of relay 1; $t'$, a wire from the magnet of relay 25 to the magnet of relay 1; $h'$, a wire from the contact-point $g$ to the magnet of relay 18, (located in this last-mentioned wire is the battery $h$;) $s$, a wire from the magnet of relay 18 to the armature of relay 2; $r$, a ground-wire connected to the magnet of relay 6; $r'$, a wire from the contact-point $r^2$ of relay 6 to the magnet of relay 8; $q$, a wire from the magnet of relay 8 to the signal 10; $q'$, a ground-wire of signal 10; $c$, the wire from the contact-point $c'$ of relay 8 to the contact-rails 14; $c^3$, a wire from the contact-rails 14 to the armature of relay 8; $c^4$, a wire from the contact-point $c^5$ of relay 8 to the ground; $c^6$, a battery located in the wire $c$; $o$, batteries located in the track 300; $n$, a wire connecting the track 300 to the magnets of relay 2, and $n'$ a wire connecting the magnet of relay 2 to the track.

I have only described the wires of one end of the block, as the wires of the other end of the block are duplicates, and I have only marked these wires on Fig. I, as this fully illustrates them. I have in the various figures attempted to show dotted lines for the wires where the circuit is broken and full lines where the circuit is closed.

Figs. XVI and XVII show the contact-rails 14 and 15 and the contact-wheels 33 of the car-trucks.

Fig. XVIII shows part of the cab 40 of a locomotive with a relay 41, that has electrical connection with the wheels 33 by means of wires 42, and which is connected to the alarm *d* by wires 43.

Figs. XIV and XV represent the torpedo signal or machine, consisting, preferably, of magnets 50, armature 51, drum 52, provided with a turning weight and cord 53, shaft 54, upon which the drum is mounted, cap-holder 55, hammer 56, vertical shaft 57, and bevel-wheels 58, with the magnet connecting the wires from the system. When the armature is pulled down, its extension 59 is disengaged from pins $52\frac{1}{2}$ on the drum 52, and the drum commences to turn under the influence of the weight 53. This causes the hammer to be disengaged by pins $57\frac{1}{2}$ on the shaft 57, which operate the hammer, causing it to strike the caps and explode them.

Figs. VII and VIII represent the circuit-breaker located in the train-dispatcher's office. It consists simply of a drum 60, provided with a turning weight 61, and a relay 62, the armature of which carries a brush 63, that rides on a notched disk 64 on the drum. I make no claim to this, *per se*.

Figs. IX to XIII, both inclusive, show one of the signals 10 or 11, consisting of a stand 70, a shaft 71, supporting the lamp 72, an operating-drum cord and weight 73, bevel-wheels 74, connecting the drum-shaft to the lamp-shaft, and a relay 75.

When the armature of the relay is operated, a projection 76 thereon is disengaged from one of the series of pins 77 on the drum 73, and the drum turns under the influence of the weight until a pin 78 comes against the projection of the armature. This turning of the drum turns the lamp, as will be plainly understood. The drum only turns a quarter of a revolution each time the armature is operated, and as the lamp is provided with two red lights and two white interspersed, it will be seen that each time it is operated a red or a white light will be presented.

I claim as my invention—

1. In an electric signal, the combination, with a curve or other portion of railway, of a normally-closed circuit, including a suitable supply and two relays and adapted to have its supply cut off by the presence of a train, a second circuit, including a torpedo-signal and controlled jointly by one of said relays and the presence of a second train, all located at one end of the portion of railway, and a third circuit, including a signal at the other end and controlled by the other of said relays, whereby the train signals ahead and sets an alarm in the rear, substantially as herein explained.

2. The combination, with a curve or other portion of a railway, of a normally-closed circuit at each end, adapted to have its supply cut off by the presence of a train, a circuit at each end, including a local torpedo-signal and controlled jointly by a relay in the local closed circuit and the presence of a second train, and a circuit controlling signals at the ends, and itself controlled by either of two relays in the closed circuits at the respective ends, whereby a train approaching from either direction signals ahead and sets an alarm behind, substantially in the manner explained.

3. The combination, with a portion of railway, of local circuits at its respective ends, controlled by the presence of a train, a third circuit controlling signals at the opposite ends and relays in the local circuits, and make-and-break devices along the line, all controlling said third circuit, whereby the trains approaching the section or a train within the section may operate the signals, substantially as explained.

4. In an electric signal for railways, the combination, with the insulated sections at opposite ends of the portion to be guarded and local circuits, including said sections and adapted to have their supplies cut off by the presence of a train on the respective sections, of a third circuit, including signals at the ends and controlled by relays in the respective local circuits, make-and-break devices to be operated at will, located at intervals between the ends, and a make-and-break device operated by a switch, substantially in the manner and for the purposes set forth.

5. The combination, with the two ends of a section of railway to be guarded, of signals thereat controlled by a circuit running between the two and having a suitable switch with a detent to prevent it returning, a circuit at each end, having a relay controlling said switch and themselves controlled by the presence of a train, and a circuit at each end, having a relay controlling the detent, the armatures of the said relays at each end being adapted to engage when successively released, so that the latter will not take effect, whereby a train coming in either direction onto the section signals in front and rear until passing the section, and then resets the signal, substantially in the manner explained.

6. In a signal for railways, the combination, with a suitable circuit, including a distant signal and a local relay, of a second circuit controlling said signal-circuit and having a suitable relay and torpedo-signal whose circuit is controlled by the above said relays, whereby it will only be operated by a succeeding train after the train has passed, as fully explained.

7. In an electric signal for railways, the combination, with a portion of the railway to be protected, of circuits at the respective ends of the portion of railway controlled by the presence of a train and having relays 1 4, relays 3 6, circuits of signals at the respective ends controlled by relays 3 6, detents engaging the armatures of relays 3 6, and circuits for releasing said detents, controlled by the presence of a train, said detent, releasing circuits being also controlled by relays 1 4, whereby the detents are not released at the end where the train enters, but only when leaving the said portion of railway, substantially as set forth.

8. The combination, with the insulated sections A B C D, of circuits including, respectively, the said sections and the relays 1, 2, 4, and 5, two circuits respectively including the relays 3 6 and controlled by relays 1 4, a circuit including signals at opposite ends of the track and controlled by both relays 3 6, and detents 7½ 18½, engaging armatures of relays 3 and 6, respectively, the armatures of relays 1 2 and 4 5 being adapted to engage substantially in the manner described, whereby a train entering either end sets the signals, but does not release them until leaving the other end, as explained.

9. In an electric signal for railways, the combination, with the insulated sections A B C D, relays 1 2 4 5, and four circuits, including, respectively, section A and relay 1, section B and relay 2, section C and relay 5, and section D and relay 4, of relays 3, 18, 6, and 7, four circuits, including, respectively, armature of relay 1 and relay 3, armature of relay 2 and relay 18, armature of relay 4 and relay 6, and armature of relay 5 and relay 7, and a circuit controlling a signal or signals at each end, the armature of relay 3 and the armature of relay 6, the armatures of relays 1 and 2, 4 and 5, 3 and 7, and 6 and 18 being adapted to engage, whereby a train entering either end sets signals at both ends and returns them when it leaves the opposite end, substantially in the manner explained.

10. In an electric signal, the combination of the circuit controlled by the presence of a train and suitable signal setting and releasing mechanism controlled by said circuit, a torpedo-signal in rear of the train-operated circuit, and a relay 25, also in said circuit and controlling the signal-circuit, whereby the rear cars of a long train will not explode said signal.

11. In a recorder or other electric signal for railways, the combination of the insulated section of railway, the normally-closed circuit, including such section and a first relay-magnet 25, a second circuit, including the normally-separated armature of the said first relay and a second relay magnet and the normally-communicating armature and contact-point of a third relay, a third circuit, including suitable supply, a recorder or signal, and a suitable make-and-break device, and a fourth circuit including a relay controlled by the recorder, the said third relay-magnet and the normally-connected contact and make-and-break controlling-armature of the said second relay, whereby the first circuit is short-circuited, the second circuit completed to release the make and break, and it in turn to operate the recorder, and in case of conflicting indications to prevent the release of the make and break, all substantially as herein described.

12. In an electric recorder for railways, the combination of the insulated section A, the normally-closed first circuit, including said section, and a first relay 25, and adapted to be short-circuited by the presence of a train on the section, a second circuit, including the normally-separated armature and contact-point of relay 25, a second relay 23, and the normally-connected armature and contact of a third relay 30, a third circuit, controlling a recorder 29 and including a make-and-break device 24, and a fourth circuit, including the armature releasing the recorder, the relay 30, and the make-and-break releasing-armature 23, whereby the passage of a train is recorded and the recording of two trains at once prevented.

PAUL DOZIER CABLE.

In presence of—
GEO. H. KNIGHT,
JOS. WAHLE.